E. F. W. ALEXANDERSON.
SINGLE PHASE MOTOR.
APPLICATION FILED DEC. 26, 1907.
935,881. Patented Oct. 5, 1909.
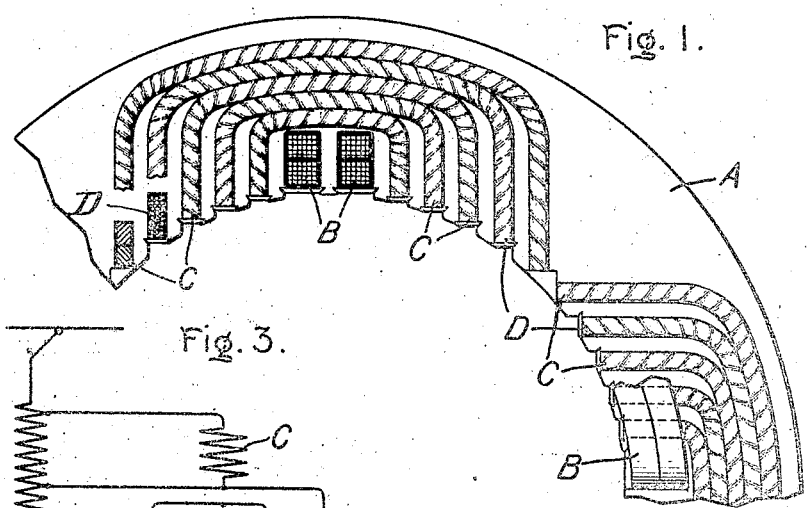
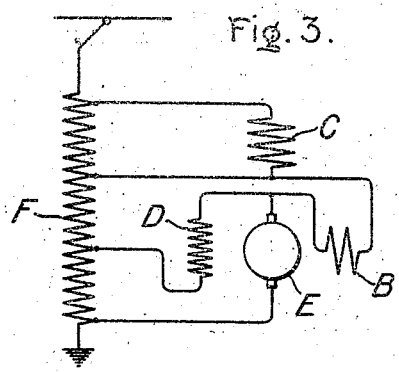
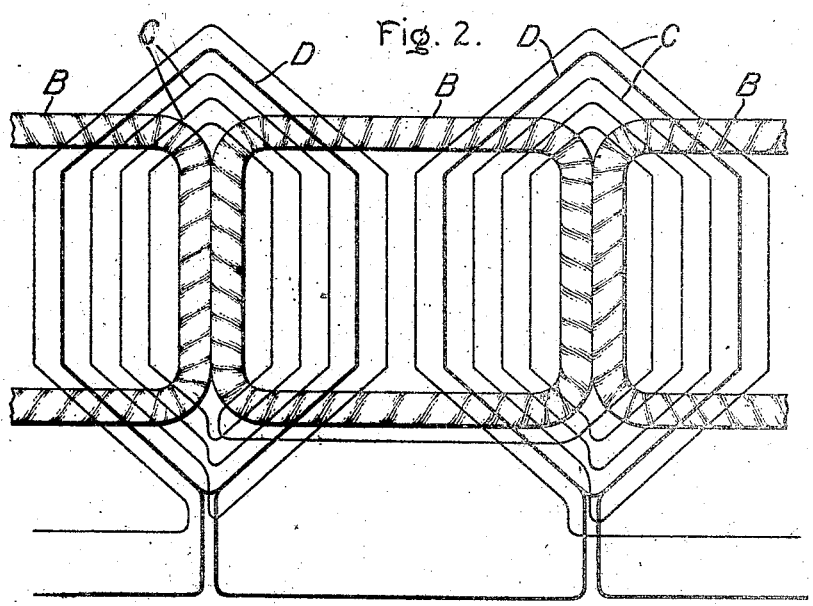
Witnesses:
George H. Tilden
J. Ellis Glen.
Inventor:
Ernst F. W. Alexanderson,
by Albert G. Davis
Att'y

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SINGLE-PHASE MOTOR.

935,881.   Specification of Letters Patent.   Patented Oct. 5, 1909.

Application filed December 26, 1907. Serial No. 408,144.

*To all whom it may concern:*

Be it known that I, ERNST F. W. ALEXANDERSON, a citizen of the United States, residing at Schenectady, county of Schenectady, State of New York, have invented certain new and useful Improvements in Single-Phase Motors, of which the following is a specification.

My invention relates to single-phase motors of the commutator type, and consists in an improvement in the arrangement described in my prior application, Serial No. 406,842, filed December 17, 1907, describing a motor which is started as a repulsion motor with its armature short-circuited; but for high-speed operation has the exciting winding on the stator connected in the armature circuit and shunt voltage impressed on armature and exciting winding in series, and a second shunt voltage impressed on the exciting winding alone through a reactance. The purpose of impressing the shunt voltage on the armature circuit was to reduce the strength of the inducing field, which field is beneficial at low speeds as regards commutation, but has an excessive and injurious effect on commutation at high speeds. The object of including the exciting winding in the armature circuit was to shift the armature current somewhat out of phase with the current in the inducing winding, so as to produce a leakage field which, when cut by the armature coils short-circuited by the brushes in commutation, would induce in those coils electromotive forces neutralizing the electromotive force of commutation reactance. The object of impressing the second shunt voltage on the field winding was to compensate for the drop in power-factor produced by connecting the exciting winding in the armature circuit, instead of in circuit with the inducing winding, and the purpose of the reactive winding in series with the second shunt voltage was to prevent this second shunt voltage from definitely fixing the amount and phase of the field flux and thereby making the motor essentially a shunt motor, as would be the case were the reactive coil omitted.

My present invention consists in a novel motor construction, whereby the reactive coil is embodied in the motor itself, so that no external apparatus is required.

My invention will best be understood by reference to the accompanying drawing, in which—

Figure 1 shows a portion of an end elevation, partly in cross-section, of the stator of a motor arranged in accordance with my invention; Fig. 2 is a diagrammatic representation of the stator coils developed on a plane surface; and Fig. 3 is a diagram of connections.

In Fig. 1, A represents the stator core, and B the exciting winding, which is concentrated in coils carried in large slots in the stator. C C represent the coils of the distributed inducing winding, which are carried in smaller stator slots. D represents coils which are carried in slots that would ordinarily be occupied by coils of the inducing winding, but which are composed of a number of turns of comparatively small wire, instead of having, like the coils of the compensating winding, one or two turns of large wire. This is indicated by the cross-section of the ends of the coils at the left-hand side of Fig. 1.

Now referring to Fig. 2, in which the coils C and D are indicated by single lines, the coils D being distinguished by heavier lines, it will be seen that these coils D are so arranged that the reactive winding formed by these coils is non-inductive with respect to the other motor windings. The coils C for one pole are oppositely connected with respect to the coils C of the adjacent pole, so as to produce opposite polarities, but all the coils D are similarly connected, so that the currents in them tend to produce the same polarity at each pole, and an opposite polarity between adjacent coils,—that is, if the motor is a four-pole motor, as is indicated in Fig. 1, the coils D have an eight-pole arrangement. Therefore, the inductive effect of the motor windings on one coil D is offset or neutralized by the inductive effect of the motor windings on the adjacent coil D, so that the reactive winding is non-inductively arranged with respect to the main motor windings. Thus, the winding formed by the coils D may be employed as the reactive winding of my former application, and its presence in the motor structure does not interfere with its own function, or with the operation of the motor.

The connections of the several windings are shown in Fig. 3, which is the same as the diagram of running connections in my former application, above referred to. The inducing winding C, the exciting winding B, and armature winding E are all connected in series with each other, and with the supply transformer F. A shunt voltage is impressed across the exciting winding B and armature E in series, while another shunt voltage is impressed across the exciting winding B through reactive winding D. The explanation of the purpose of these connections has been given above, and need not be repeated here.

I do not desire to limit myself to the particular construction and arrangement of parts here shown, but aim in the appended claims to cover all modification which are within the scope of my invention.

What I claim as new and desire to secure by Letters Patent of the United States, is,—

1. A single-phase motor of the commutator type having inducing and exciting windings on the stator, and a reactive winding carried in the stator slots arranged non-inductively with respect to all the other windings on the motor and connected to said exciting winding.

2. A single-phase motor of the commutator type having inducing and exciting windings on the stator, and a reactive winding carried in the stator slots, said reactive winding being of a different pole-number from that of all the other windings on the motor and being connected to said exciting winding.

3. A single-phase motor of the commutator type having inducing and exciting windings on the stator, a reactive winding carried in the stator slots arranged non-inductively with respect to the first-mentioned windings, and means for impressing a shunt voltage on said exciting winding and said reactive winding in series.

4. A single-phase motor of the commutator type having inducing and exciting windings on the stator, a reactive winding carried in the stator slots, said reactive winding being of a different pole-number from that of the first-mentioned windings, and means for impressing a shunt voltage on said exciting winding and said reactive winding in series.

5. A single-phase motor of the commutator type having inducing and exciting windings on the stator, a reactive winding carried in the stator slots arranged non-inductively with respect to the first-mentioned windings, a transformer for supplying current to the motor, and conductors arranged to connect the exciting and armature windings of the motor in series and to a portion of the transformer winding and to establish a connection from the junction of the exciting and armature windings through said reactive coil to an intermediate point on the transformer winding.

6. A single-phase motor of the commutator type having inducing and exciting windings on the stator, a reactive winding carried in the stator slots arranged non-inductively with respect to the first-mentioned windings, a transformer for supplying current to the motor, and conductors arranged to connect the motor to the transformer with the inducing, exciting and armature windings in series in the order named, and to establish connections from both terminals of the exciting winding to intermediate points on the transformer winding, said reactive winding being included in one of said connections.

In witness whereof, I have hereunto set my hand this 23rd day of December, 1907.

ERNST F. W. ALEXANDERSON.

Witnesses:
BENJAMIN B. HULL,
HELEN ORFORD.